Nov. 2, 1948.　　　　R. C. MATHEWSON　　　　2,452,778
UNIVERSAL SWIVEL
Filed March 6, 1944　　　　　　　　　　　　2 Sheets-Sheet 1
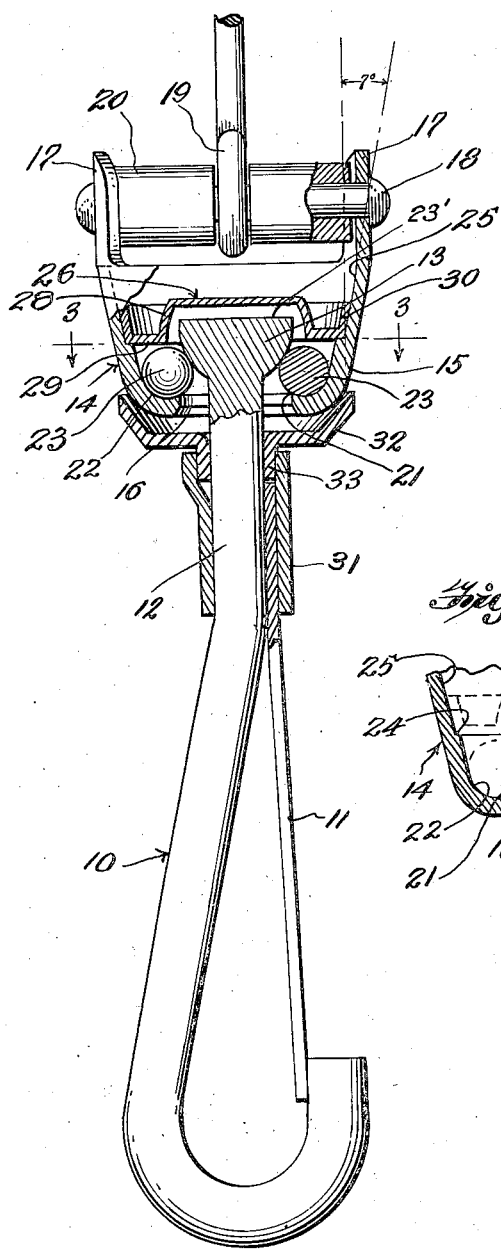
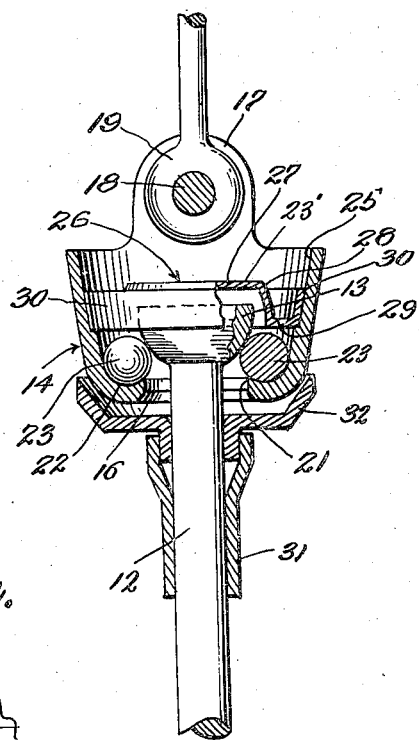
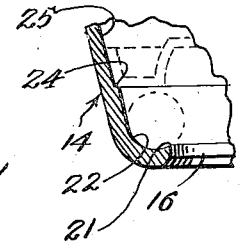
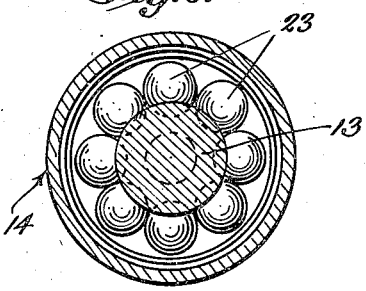
Inventor
RALPH C. MATHEWSON
By Wilfred E. Lawson
Attorney

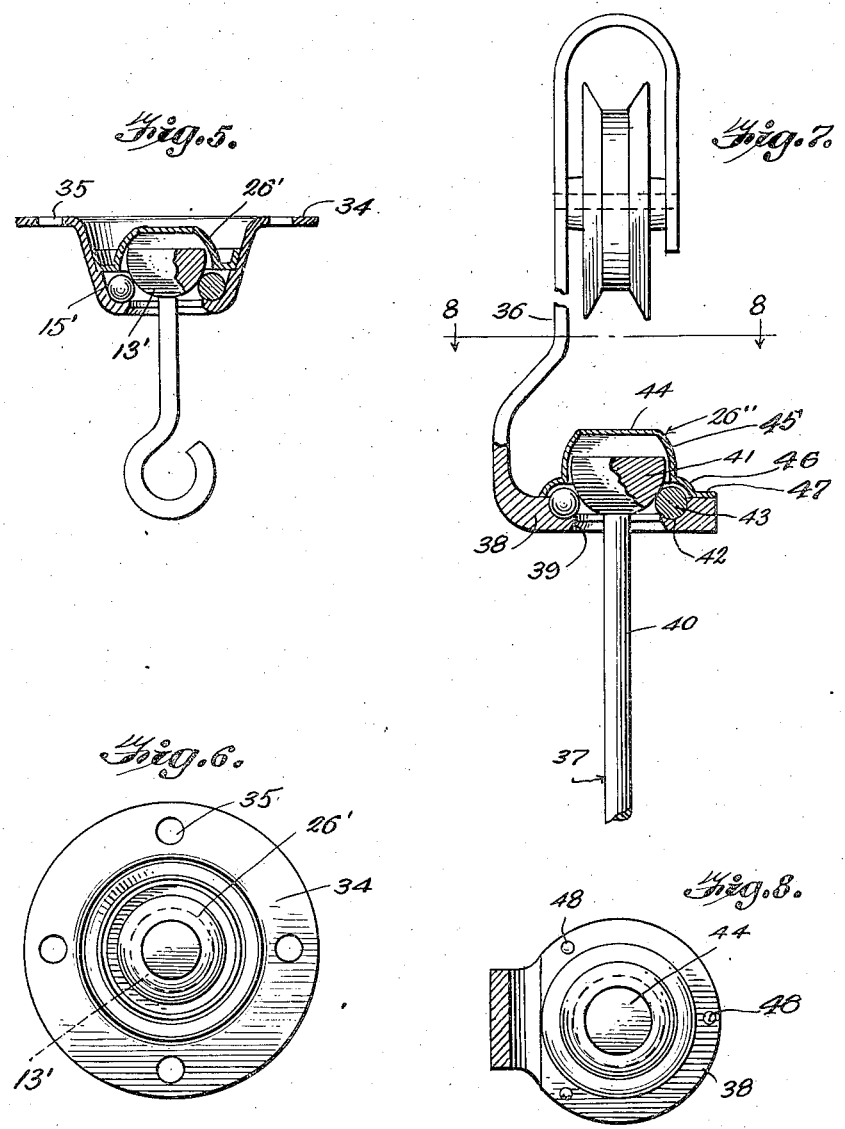

Patented Nov. 2, 1948

2,452,778

UNITED STATES PATENT OFFICE 2,452,778

UNIVERSAL SWIVEL

Ralph C. Mathewson, West Pittston, Pa.

Application March 6, 1944, Serial No. 525,231

4 Claims. (Cl. 248—341)

This invention relates generally to swivel couplings and pertains particularly to an improved coupling which is designed with the primary object of reducing friction, and consequently wear, to a minimum between two relatively moveable members.

An important object of the invention is to provide a universal swivel coupling or a swivel support of the ball and socket type, wherein the socket is formed in a novel manner for a novel co-action with a closure cap which is designed to function as a lubricant receptacle and also as retainer for an annular series of anti-friction balls in the cup.

Another and more specific object of the invention is to provide a universal swivel coupling of the ball and socket type wherein the socket has an interior wall taper for co-action with a correspondingly tapered flange forming a part of a cover cap for the socket whereby such cap when pressed into the socket or cup is securely maintained in position by friction alone.

Other objects and advantages of the invention will become apparent as the description of the same proceeds and the invention will be best understood from a consideration of the following detailed description taken in connection with the accompanying drawings, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view partly in elevation and partly in section of one embodiment of the present invention.

Figure 2 is a vertical section taken in a plane perpendicular to the section of and through the structure shown in the upper part of Figure 1.

Figure 3 is a horizontal section taken on the line 3—3 of Figure 1.

Figure 4 is a fragmentary section through the portion of the cup.

Figure 5 is a view partly in section and partly in elevation of a second embodiment of the invention.

Figure 6 is a view in top plan of the embodiment of Figure 5.

Figure 7 illustrates another embodiment of the invention, parts being in section.

Figure 8 is a horizontal section on the line 8—8 of Figure 7.

Referring now more particularly to the drawing the present invention is illustrated in one embodiment in Figures 1 to 4 as applied to a snap hook which is generally designated 10 and which has the usual spring tongue 11 which is secured to the shank portion 12 of the hook. The shank portion 12 of the hook here illustrated forms the stem of the substantially semi-spherical ball 13 which forms a part of the swivel which is generally designated 14 and the portion 12 will hereinafter be referred to as the stem as it is to be understood that this does not necessarily form a part of a hook as shown but may be a bolt or any other rod-like body designed to support a weight or designed to be secured to a fixed terminal.

The swivel 14 comprises, in addition to the ball or head 13 of the stem, a cup 15 which has the relatively large aperture 16 formed therein in the bottom thereof through which the stem 12 passes. This aperture is of a diameter materially larger than that of the stem so that free lateral swinging of the stem relative to the swivel cup or socket 15 may be had.

In the embodiment illustrated in Figures 1 to 4 there is formed integrally with the cup 15, the diametrically opposite upstanding ears 17 which are apertured to receive a pin or bolt 18 which may be extended through a chain link 19 or any other type of eye forming a part of a suspension means, not shown.

For the purpose of centering the chain link or eye 19 upon the bolt 18 the collars 20 are placed upon the bolt upon opposite sides of the link 19 and between the ears 17 as illustrated.

The bottom portion of the cup 15 is turned or extended upward slightly around the opening 16, as indicated at 21 and between this upturned portion and the side wall of the cup, the inside bottom surface is suitably rounded to form the ball raceway 22 for the reception of the anti-friction balls 23.

As shown the ball 13 has the flat top 23 which lies slightly above the center of the ball.

In a plane slightly below the flat top 23 of the ball the inner wall of the cup 15 is recessed to form the annular shoulder 24 and the wall portion 25 of the cup above the shoulder is inclined outwardly from the vertical at about a seven degree inclination.

The numeral 26 generally designates the cap or dome of the coupling, which closes the cup above the ball head 13 and the supporting antifriction balls 23 therefor.

This cap 26 comprises a central top portion 27 having the surrounding transversely arcuate rim 28 which merges with the outwardly extending annular flat wall 29. The outer periphery of the wall 29 is integral with the upwardly and outwardly extending flange 30. The flange 30 is of an over-all diameter corresponding with the interior diameter of the cup wall immediately above the shoulder 24 and the flange has the same degree of inclination as the cup wall of the shoulder 24.

The dome or cap 26 is press fitted into the cup, the flange 30 of the cap bearing tightly throughout its entire outer face against the wall surface 25 and maintaining tight frictional contact therewith. The straight annular wall portion 29 of the cap lies in close proximity to the anti-friction balls 23 and functions to maintain the balls in the raceway.

The dome or cap 26 in addition to preventing upward movement of the stem ball 13 functions to maintain a suitable lubricant in the cup round the stem ball and the anti-friction balls.

In the application of the swivel to a snap hook such as is illustrated the spring tongue is secured by a collar 31 encircling the stem as shown. This collar may also be employed for maintaining in position closely beneath the under side or bottom of the cup, a dust cap 32 through engagement about the flange 33 which forms an integral part of such cap and which closely encircles the stem 12. This cap or shield conforms roughly to the shape of the bottom of the cup and extends well beyond the edge of the opening 16 and functions to catch any lubricant which may escape through the opening to prevent such lubricant from dropping onto any article which may be coupled with the stem or suspended on the hook 10.

In the embodiment of the invention as illustrated in Figure 5 the construction or form is the same as in the first described embodiment, with respect to the angular inclination of the inner wall and of the other features pertaining to the cap, which is here designated 26', the stem ball 13' and all other parts with the exception of the top part of the cup. This cup is designated 15' and, in place of the ears 17 previously referred to it is formed at its top edge integrally with the outwardly projecting rim 34. This rim completely encircles the top portion of the cup and is provided with suitable apertures 35 for the passage of securing elements, whereby the cup may be secured to any suitable flat support such as a ceiling or the like.

In Figure 7 there is illustrated a third embodiment of the invention as applied to a hanger 36 such as might be used in meat packing houses for the support of a traveling hook 37.

In this embodiment the lower part of the hanger bar 36 is turned to extend laterally, perpendicular to the bar and such laterally extending portion is designated 38 and is in the form of a flat plate.

Through the center of the plate 38 is formed the aperture 39 through which extends the stem 40 which forms an integral part of the hook and also of the swivel head or ball 41.

The top surface of the plate 38 immediately adjacent to the opening 39 is provided with the annular ball raceway 42 which is concentric with the opening 39 and in which lie the series of anti-friction balls 43, upon which the rounded under side of the ball head 41 rests.

The numeral 26" generally designates the cap or dome cover for the ball head portion 41 and the anti-friction balls 43, corresponding to the cap 26. This cap 26" has the flat top wall 44 which merges with the outwardly and downwardly curving rim 45 which at its lower edge merges with the encircling transversely convexed raceway 46. This raceway of the cap merges with the flat encircling flange 47 which rests upon the flat top surface of the plate 38 to which it is secured by suitable screws, bolts or the like as indicated at 48.

The arcuate curvature of the cap raceway 46 conforms with the curvature of the raceway 42 in the plate 38 to closely conform to the curvature of the anti-friction balls 43 but is slightly spaced from the balls so that they will have free rolling movement upon rotation and oscillation of the head ball 41.

In this embodiment as in each of the other embodiments described the top 44 of the cap is spaced from the flat top of the ball 41 providing a chamber which is filled or packed with lubricating grease.

From the foregoing it will be readily apparent that there is provided in the several embodiments of the present invention, a novel universal swivel coupling in which maximum movement is given to the stem which is connected with the central ball of the coupling structure and the design and relation of the several parts one to another allows for any degree of rapid turning and/or oscillatory movement with a minimum of friction and wear.

I claim:

1. A universal swivel coupling, comprising a body having an opening the body being shaped to provide a bearing ball raceway encircling the opening, bearing balls in said raceway, a ball resting on said bearing balls and having a stem extending through said opening, and a cap comprising a central portion encasing the upper part of the ball, an encircling flange secured to the body and a part intermediate the central portion and the flange and lying over and in close proximity to but spaced from the bearing balls and coacting with said raceway to maintain the bearing balls in operative position.

2. A universal swivel coupling, comprising a cup having a central opening in the bottom thereof, means forming a bearing ball raceway around and concentric with the opening, bearing balls within said raceway, a center ball resting upon and in contact with the bearing balls and having a stem extending through the opening, and a circular cap pressed into the cup and lying above the bearing balls and the centre ball and secured in place by having the peripheral portion thereof in tight frictional contact with the inner wall of the cup, said cap coacting with said raceway to maintain the bearing balls in operative position.

3. A universal swivel coupling comprising a cup having a central bottom opening, the inner surface of the bottom being formed to provide a ball raceway encircling the opening, the inner wall of the cup being formed to provide an encircling shoulder above said raceway, bearing balls in the raceway, a central ball resting upon the bearing balls and having a stem extending through said opening, said cup inner wall having an outward taper from said shoulder, and a cap closing the cup above the bearing balls and the center ball, said cap comprising a central portion partially enclosing the center ball, a laterally extending flat portion lying over and in close proximity to the bearing balls and functioning to retain the balls in the raceway, and an upwardly and outwardly inclined flange integral with the lateral flat portion, said flange having the same degree of inclination from the center as the wall above the shoulder and having tight frictional contact with the wall above the shoulder and resting against said shoulder.

4. A universal swivel coupling comprising a hanger bar terminating in a laterally directed flat plate having a circular opening therethrough, said plate having a top face provided with an annular channel concentric with the opening and forming a ball raceway, bearing balls in said raceway, a center ball resting upon the balls in the raceway and having a stem extending through said opening, the opening being of materially greater diameter than the diameter of the stem to permit free swinging of the stem and a cap covering the center ball and the balls in the raceway, comprising a central portion designed to partially enclose the center ball and having an encircling rim, said encircling rim merging with a transversely arcuate encircling plate arranged to co-act with said ball raceway to cover the bearing balls, and said plate merging with an outwardly extending peripheral flange, said flange resting upon and being secured to the first mentioned plate.

RALPH C. MATHEWSON.

REFERENCES CITED

The following references are of record in the file of this patent:

UNITED STATES PATENTS

| Number | Name | Date |
| --- | --- | --- |
| 381,043 | Vauclain | Apr. 10, 1888 |
| 1,454,587 | Gunn | May 8, 1923 |
| 1,701,683 | Leas | Feb. 12, 1929 |
| 1,910,926 | Lutz | May 23, 1933 |
| 2,037,786 | Hufferd | Apr. 21, 1936 |
| 2,110,561 | Stephens | Mar. 8, 1938 |